C. WILSON.
COUPLING.
APPLICATION FILED JULY 15, 1919.

1,353,299.

Patented Sept. 21, 1920.

Inventor:
Charles Wilson.
by Spear, Middleton, Donaldson & Ball
Attys.

UNITED STATES PATENT OFFICE.

CHARLES WILSON, OF COVENTRY, ENGLAND.

COUPLING.

1,353,299.   Specification of Letters Patent.   Patented Sept. 21, 1920.

Application filed July 15, 1919. Serial No. 310,925.

*To all whom it may concern:*

Be it known that I, CHARLES WILSON, a subject of the King of England, residing at Coventry, in the county of Warwick, England, have invented certain new and useful Improvements in Couplings, of which the following is a specification.

This invention relates to co-axially mounted relatively rotatable members and has for its principal object to provide simple means whereby one member can be moved endwise of the other by a limited and predetermined amount. This invention is not restricted to any particular mechanism, but can be applied to a number of mechanical devices where such movements aforesaid are necessary or desirable.

According to this invention there are combined with two members, mounted one outside the other and relatively rotatable and endwise movable, a plurality of balls which lie partly in a circumferentially disposed groove in the one member, and partly in a circumferential groove in the adjacent surface of the other member, the ball-diameter being less than the width of one or both of the said grooves. By this construction the balls limit the endwise movement of the two members relative to one another in accordance with the difference between the diameter of the balls and the width of the groove or grooves, and may also form an anti-friction device both for radial and end-thrust of the two members.

The invention is particularly applicable for use in connection with chucks, such as drill-chucks, which can be opened and closed while the chuck is rotating by the axial movement of a sleeve loosely mounted on the body of the chuck. The mechanism of such chucks is well known and forms no part of the present invention.

In the accompanying drawings.

Like letters indicate like parts throughout the drawings.

Figure 3:
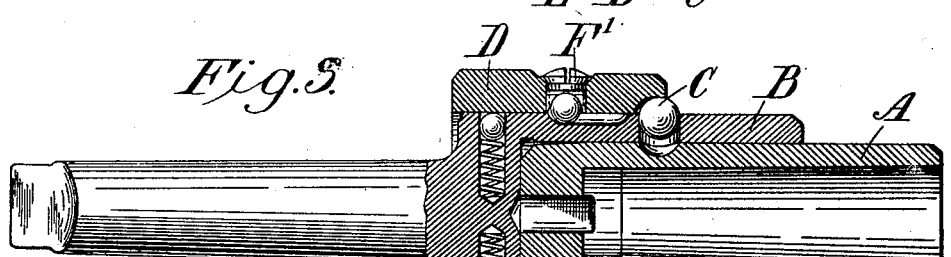
Figure 4:
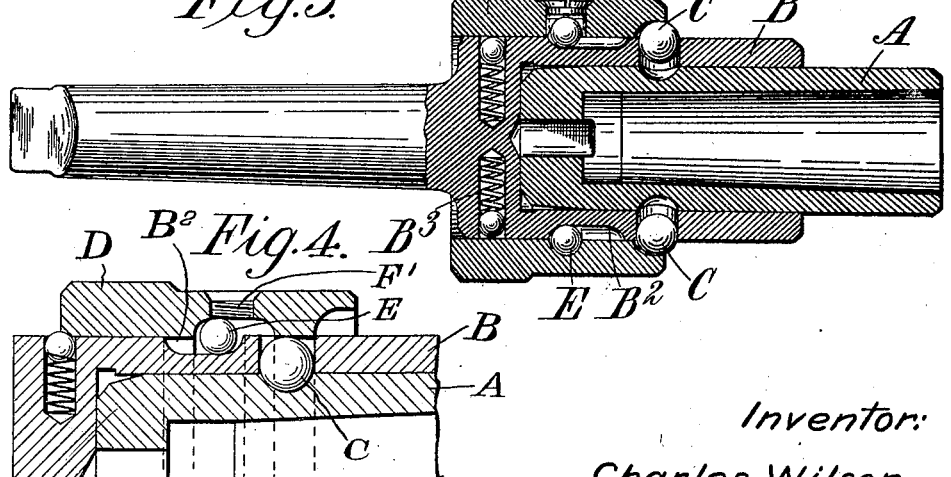
Fig. 4 is a longitudinal section of a modification.

In this known type of chuck the drill holder A is secured to the body B by a number of balls C which serve as keys. When the sleeve D is moved to the left as is shown in Fig. 3, the balls C fly out by centrifugal action and disengage the holder A, which can then be removed. A reverse action locks the holder A to the body B.

The sleeve D has formed in it a circumferential groove $D^2$ of semi-circular cross-section adapted to form a race for the balls E. In the body B is also formed a circumferential groove $B^2$ to lie opposite to and coöperate with the groove $D^2$ in the sleeve, but having a width greater than the groove $D^2$ by the amount of endwise movement required for the sleeve. A plurality of anti-friction balls E are inserted into the grooves $B^2$ and $D^2$ to lie partly in each, and for their introduction therein a hole is pierced in the side wall of the sleeve to communicate with its groove, a screw plug $F'$ or the like being provided to close the hole after the insertion of the balls. By this construction the sleeve D can be freely rotated on the chuck or moved endwise thereon for a distance equal to the amount by which the groove $B^2$ exceeds the ball-diameter in width.

An important feature of the invention is the connection of the two members by a plurality of balls arranged around the chuck whereby the loads applied are distributed among them, and friction and wear of the engaged parts are thus reduced.

Obviously, in mechanism for transmitting relatively heavy loads, any desired number of coöperating grooves $B^2$ and $D^2$ may be employed, each pair of grooves being provided with balls E as above described.

Figure 1:
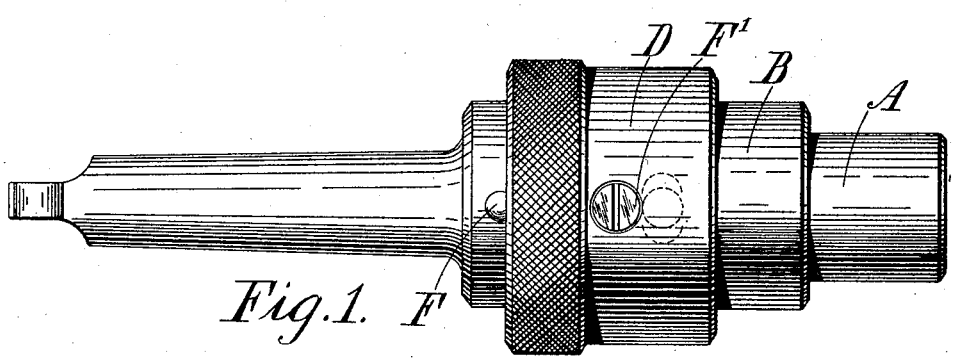
Figure 1 is a side elevation of a chuck constructed in accordance with this invention.
Figure 2:
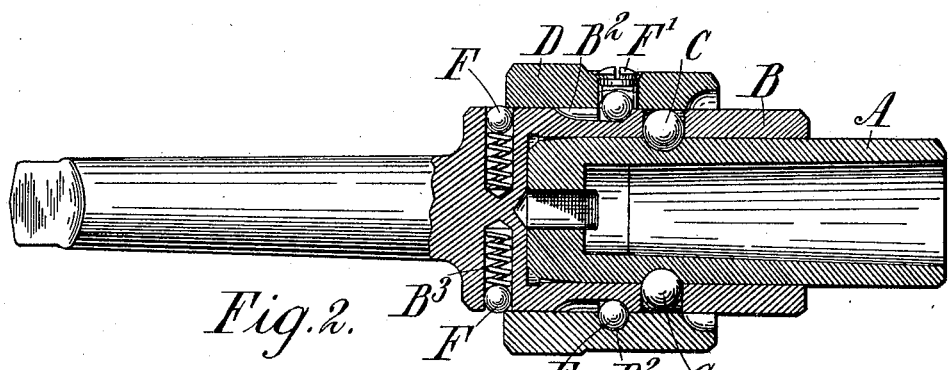
Figs. 2 and 3 are longitudinal sectional views showing the chuck closed and open respectively.

To hold the sleeve in the position shown in Fig. 2, the body of the chuck may carry one or more spring pressed plungers or balls F, adapted to engage the end of the sleeve when in that position. When the sleeve is moved to the other limit of its movement, the balls F retire into the pockets $B^3$ in the body.

If desired, each or either groove of a pair may be made wider than the ball diameter, with or without cages of appropriate form to guide and space the balls apart in a circumferential path.

What I claim as my invention and desire to secure by Letters Patent is:—

1. The combination of an inner member, a circumferential groove upon the outside thereof, an outer member which can rotate upon and move endwise in relation to said inner member, a circumferential groove upon the inside of said outer member, and balls of a diameter less than the width of said grooves engaging both of said grooves, substantially as set forth.

2. The combination of a drill chuck body, a circumferential groove upon the outside thereof, an operating sleeve which can rotate upon and move endwise in relation to said body, a circumferential groove upon the inside of said operating sleeve, and balls of a diameter less than the width of the groove upon said body which engage both of said grooves, substantially as set forth.

In testimony whereof I have signed my name to this specification in the presence of two subscribing witnesses.

CHARLES WILSON.

Witnesses:
 ALBERT BROWN,
 ANNIE L. WADE.